United States Patent
Nakamura (10) Patent No.: US 8,634,107 B2
(45) Date of Patent: Jan. 21, 2014

(54) PRINT DATA PROCESSING SYSTEM, PRINT DATA PROCESSING METHOD, AND NON-TRANSITORY COMPUTER READABLE MEDIUM

(75) Inventor: Yoshinobu Nakamura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 58 days.

(21) Appl. No.: 13/474,344

(22) Filed: May 17, 2012

(65) Prior Publication Data

US 2013/0077104 A1  Mar. 28, 2013

(30) Foreign Application Priority Data

Sep. 26, 2011 (JP) .................................. 2011-209069

(51) Int. Cl.
*G06K 15/02* (2006.01)
(52) U.S. Cl.
USPC .............................. 358/1.9; 358/1.18; 358/2.1
(58) Field of Classification Search
USPC ........... 358/1.2, 1.5, 1.9, 1.11, 1.15, 1.18, 2.1
See application file for complete search history.

(56) References Cited

U.S. PATENT DOCUMENTS 5,859,954 A * 1/1999 Toda .............................. 358/1.2
6,219,149 B1 * 4/2001 Kawata et al. ................. 358/1.9

FOREIGN PATENT DOCUMENTS

| JP | 2001-160062 A | 6/2001 |
| JP | 2011-25422 A | 2/2011 |
| JP | 2011-70337 A | 4/2011 |

* cited by examiner

*Primary Examiner* — Kimberly A Williams
(74) *Attorney, Agent, or Firm* — Sughrue Mion, PLLC (57) ABSTRACT

A print data processing system includes a print data interpretation processing unit, a memory, and a raster image data generation unit. The print data interpretation processing unit interprets PDL print data, and generates first intermediate format data, second intermediate format data, and attribute information. The memory stores the first intermediate format data and first raster image data of each image object of a predetermined type. The first raster image is generated by performing a drawing process on the first intermediate format data. When an image object of the predetermined type and another image object overlap, the raster image data generation unit uses the first intermediate format data to generate second raster image data. When an image object of the predetermined type and another image object do not overlap, the raster image data generation unit uses the first raster image data to generate the second raster image data.

4 Claims, 7 Drawing Sheets

| ID | IDENTIFIER IN PRINT DATA | WHETHER ANOTHER COMPONENT OVERLAPS FORM/IMAGE |
|---|---|---|
| 1 | 1234567890123450 | FALSE |
| 2 | 2234567890123450 | TRUE |
| 3 | 3234567890123450 | TRUE |
| 4 | 4234567890123450 | TRUE |
| 5 | 5234567890123450 | FALSE |
| 6 | 6234567890123450 | FALSE |
| 7 | 7234567890123450 | FALSE |
| 8 | 8234567890123450 | FALSE |
| 9 | 9234567890123450 | FALSE |
| ... | ... | ... |

FIG. 7

PRINT DATA PROCESSING SYSTEM, PRINT DATA PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-209069 filed Sep. 26, 2011.

BACKGROUND

Technical Field

The present invention relates to a print data processing system, a print data processing method, and a non-transitory computer readable medium.

SUMMARY

According to an aspect of the invention, there is provided a print data processing system including a print data interpretation processing unit, a memory, and a raster image data generation unit. The print data interpretation processing unit interprets print data of a to-be-printed image written in a page description language and generates first intermediate format data, second intermediate format data, and attribute information. The first intermediate format data represents each image object of a predetermined type contained in the to-be-printed image. The second intermediate format data represents a portion of the to-be-printed image that is other than each image object of the predetermined type. The attribute information is information about each image object of the predetermined type and indicates whether or not the image object and another image object overlap within the to-be-printed image. The memory stores the first intermediate format data and first raster image data of each image object of the predetermined type. The first raster image data is generated by performing a drawing process on the first intermediate format data. The raster image data generation unit generates second raster image data to be supplied to a printer, by using the first intermediate format data and the first raster image data of each image object of the predetermined type that are stored in the memory and the second intermediate format data. When the attribute information of each image object of the predetermined type indicates that the image object and another image object overlap within the to-be-printed image, the raster image data generation unit reads out the first intermediate format data of the image object from the memory and uses the first intermediate format data in the generation of the second raster image data. When the attribute information of each image object of the predetermined type indicates that the image object and another image object do not overlap, the raster image data generation unit reads out the first raster image data of the image object from the memory and uses the first raster image data in the generation of the second raster image data.

BRIEF DESCRIPTION OF THE DRAWINGS

An exemplary embodiment of the present invention will be described in detail based on the following figures, wherein.

DETAILED DESCRIPTION

Figure 1:
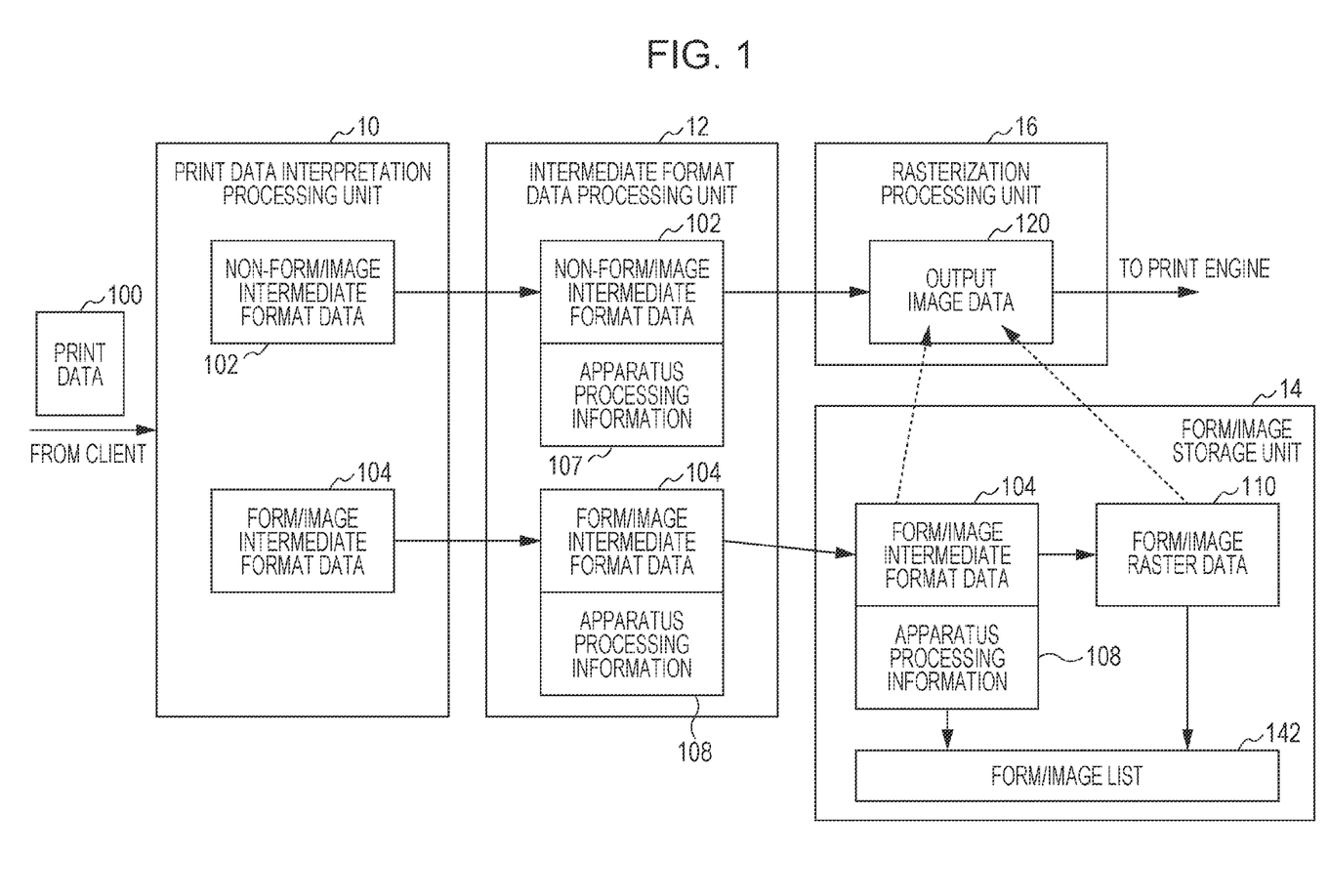
FIG. 1 illustrates an example of a system configuration according to an exemplary embodiment.

FIG. 1 schematically illustrates an example of a configuration of a print data processing system according to an exemplary embodiment. The print data processing system according to the exemplary embodiment processes print data 100 written in a page description language, which is, for example, input from a client (e.g., a personal computer) via a network or received with being stored on a portable storage medium, thereby generating raster image data receivable by a print engine (not illustrated). The print data processing system then supplies the generated raster image data to the print engine so as to cause the print engine to perform printing. The print engine is an apparatus that applies colorants, such as inks or toners, onto a sheet in accordance with pixel values contained in the input raster image data, thereby printing an image on the sheet. Hereinafter, a page description language is abbreviated as a "PDL" in order to make the description brief.

As illustrated in FIG. 1, this print data processing system includes a print data interpretation processing unit 10, an intermediate format data processing unit 12, a form/image storage unit 14, and a rasterization processing unit 16. In addition to the components illustrated in FIG. 1, the print data processing system may include a job management unit that enters input pieces of print data (also referred to as jobs) in a queue and manages the execution order of these jobs.

The print data interpretation processing unit 10 interprets the input print data 100, and generates intermediate format data 102 and intermediate format data 104. The print data 100 is data in which a to-be-printed image of each page is written in a PDL, such as PostScript (registered trademark) or portable document format (PDF). The intermediate format data is data having a granularity between a granularity of print data written in a PDL and a granularity of raster image data receivable by the print engine. For example, the intermediate format data is data in a format representing segments, which are obtained by dividing objects (individual components constituting a printed image of a page) represented by PDL commands in units of bands or scanning lines. Each intermediate format data item representing a segment includes information on the type of the object to which the segment belongs, the position of the segment, a drawing instruction regarding the segment, and the color of the segment, for example. A display list is well known as an example of the intermediate format data but the intermediate format data is not limited to the display list. Any method in the related art may be used for conversion of PDL print data into intermediate format data.

The print data interpretation processing unit 10 according to this exemplary embodiment does not merely convert the print data 100 into intermediate format data but separately generates the intermediate format data 102 for non-forms/ images and the intermediate format data 104 for forms/images. Here, a "form/image" indicates an object that is of a form type or an image type.

Specifically, print data includes various types of objects, such as character strings, line drawings, filled figures, images (bitmap images such as photographs), and forms (objects supposed to be reused). Among the various types of objects, a greater benefit of caching is expected for forms and images than for objects of other types. In addition, in many PDLs such as PostScript and PDF, identifiers are assigned to forms and images in print data (in contrast, identifiers are not assigned to character strings, line drawings, and figures). The use of these identifiers makes it easier to realize caching. For these reasons, the "form/image intermediate format data 104" derived from form/image objects for which the use of a cache is effective is generated separately from the "non-form/image intermediate format data 102" derived from non-form/image objects. Here, form/image objects are used as objects to be cached only by way of example. The print data interpretation processing unit 10 just has to generate intermediate format data for objects of types to be cached separately from that for objects of other types.

Whether each object in the print data 100 is a form/image or another type (a character string, line drawing, or figure) may be determined from object type information written in the print data 100. For example, in PostScript, the operator for a drawing (painting) instruction differs depending on the object type, such as "image" for images, "execform" for forms, and "show" for character strings. Thus, the print data interpretation processing unit 10 may distinguish between forms/images and the others in accordance with the drawing operators contained in the print data 100.

Figure 2:
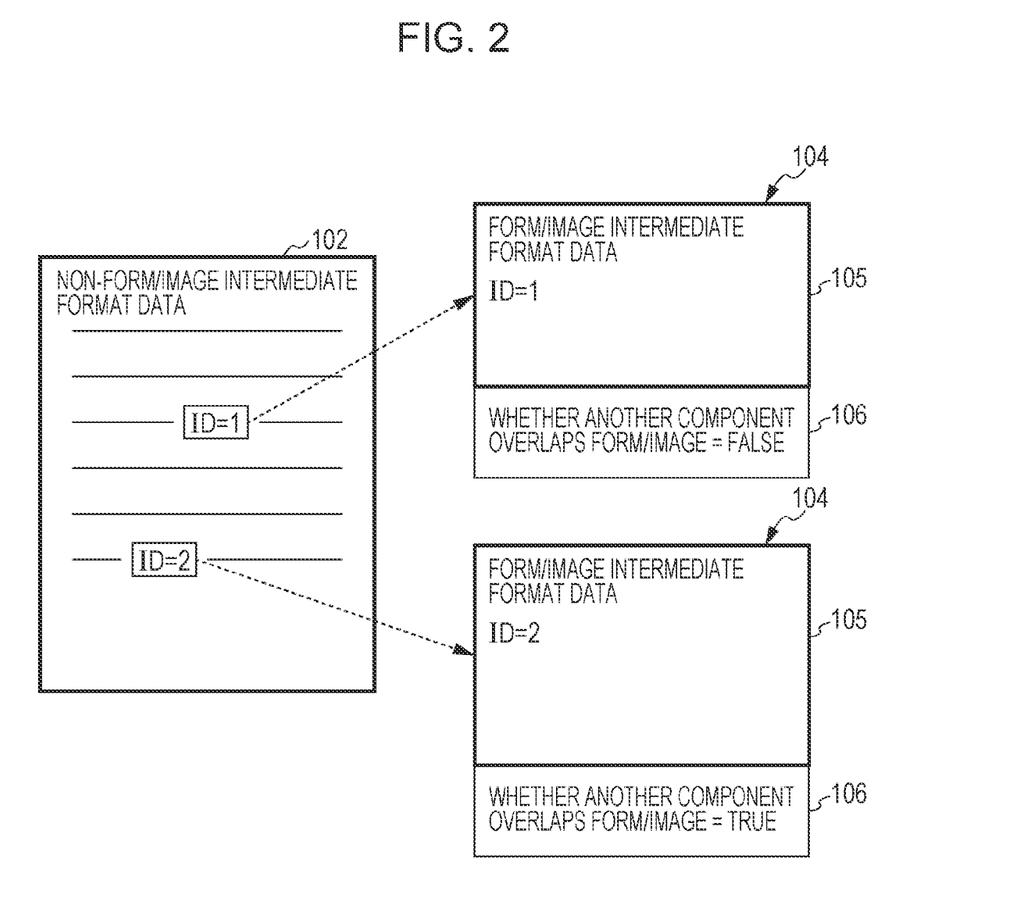
FIG. 2 schematically illustrates form/image intermediate format data and non-form/image intermediate format data.

FIG. 2 schematically illustrates examples of the non-form/image intermediate format data 102 and the form/image intermediate format data 104 that are generated by the print data interpretation processing unit 10. In these examples, one page includes two form/image objects which are assigned IDs (identification information) of "1" and "2". These IDs are assigned by the print data interpretation processing unit 10.

The non-form/image intermediate format data 102 corresponds to an intermediate format representation which is generated from the page and in which the form/image objects are replaced with the IDs.

On the other hand, each form/image intermediate format data 104 generated from PDL data of the corresponding form/image object includes an intermediate format data portion 105, and attribute information 106 on the basis of which the use of cached intermediate format data or cached raster format data is determined. The intermediate format data portion 105 includes the ID of the object and intermediate format data items that represent segments of the object. The intermediate format data portion 105 also includes information on the identifier of the form/image object in the print data 100. In this example, the attribute information 106 indicates whether or not another object overlaps this (form/image) object. For example, in a page image 200 illustrated in FIG. 3, a character string object 202 and a form/image object 204 are located at different positions, and thus no object overlaps the form/image object 204. In contrast, in a page image 210 illustrated in FIG. 4, a character string object 212 overlaps a form/image object 214. Referring to the examples illustrated in FIG. 2, the value "true" of the attribute information 106 indicates that another object "overlaps" this object, whereas the value "false" indicates another object "does not overlap" this object. This attribute information 106 is used by the rasterization processing unit 16 to determine which of the intermediate format data or the raster format data of the object stored in the form/image storage unit 14 (cache) to use. Meanwhile, the attribute information 106 may indicate whether or not a form/image object and another object overlap (i.e., a case where a form/image object overlaps another object is also included) instead of indicating whether or not another object overlaps the form/image object.

During interpretation of the print data 100, the print data interpretation processing unit 10 obtains the types of objects and the overlapping state of the objects. Accordingly, if the type of an object is a form or an image, the print data interpretation processing unit 10 generates the form/image intermediate format data 104 for the object, and decides the value of the attribute information 106 in accordance with the overlapping state of the object and another object.

Specifically, the print data interpretation processing unit 10 sequentially interprets the print data 100 from the start. If an object reached during the interpretation is not a form/image, the print data interpretation processing unit 10 writes the intermediate format data 102 resulting from the interpretation in a memory area for the non-form/image intermediate format data 102 as in the related art, the memory area being allocated in a memory space of the print data processing system. Upon finding a form/image object, the print data interpretation processing unit 10 assigns a unique ID to the object, generates the form/image intermediate format data 104 (including the assigned unique ID, the identifier of the object in the print data 100, and the attribute information 106) of the object, and writes the form/image intermediate format data 104 in a memory space. Additionally, the print data interpretation processing unit 10 writes the assigned unique ID in place of the intermediate format data 104 of the object in the memory area for the non-form/image intermediate format data 102. By repeating such a process, one piece of non-form/image intermediate format data 102 and as many pieces of form/image intermediate format data 104 as the number of form/image objects included in the print data 100 are generated.

When plural identical forms/images (i.e., objects having the same identifier written in the print data 100) exist in the print data 100, the print data interpretation processing unit 10 assigns different IDs to the pieces of intermediate format data 104 of the identical forms/images. This is because the overlapping states of the objects and another object differ when arranged positions of the objects differ even if the objects are identical.

Regarding the first form/image among the forms/images having the same identifier, the print data interpretation processing unit 10 may generate the intermediate format data portion 105 including actual intermediate format data items, when sequentially interpreting the print data 100 from the start. Regarding the second and following forms/images, the print data interpretation processing unit 10 may generate the intermediate format data portion 105 that includes the unique ID and the identifier of the forms/images in the print data 100 but does not include the actual intermediate format data items. In this manner, when the same form/image appears in the print data 100 two or more times, an amount of intermediate format data 104 is reduced regarding the second and following forms/images. This consequently reduces an amount of data to be transferred between the print data interpretation processing unit 10, the intermediate format data processing unit 12, and the form/image storage unit 14 and an amount of data stored in the form/image storage unit 14.

The non-form/image intermediate format data 102 and the form/image intermediate format data 104 generated by the print data interpretation processing unit 10 are supplied to the intermediate format data processing unit 12.

The intermediate format data processing unit 12 attaches apparatus processing information 107 to the received non-form/image intermediate format data 102, and attaches apparatus processing information 108 to the received form/image intermediate format data 104. The pieces of apparatus processing information 107 and 108 are about printing settings which are made by an operator in the print data processing system, and include (but not limited to) setting values of rotation, imposition, calibration, and marking, for example. Imposition refers to a process of arranging and printing plural logical pages on one physical page (one surface of a sheet), and is also called N-up (where N represents the number of logical pages arranged on one physical page). Calibration refers to a color correction process. Marking refers to a process of printing reference marks used for post-printing processing, such as trim marks. These pieces of apparatus processing information 107 and 108 are not included in the input print data 100 but are set by an operator of the print data processing system in accordance with print conditions specified for the print data 100 by a requestor. The apparatus processing information 107 attached to the non-form/image intermediate format data 102 and the apparatus processing information 108 attached to the form/image intermediate format data 104 have the same content. The intermediate format data processing unit 12 supplies the rasterization processing unit 16 with the non-form/image intermediate format data 102 attached with the apparatus processing information 107, and supplies the form/image storage unit 14 with the form/image intermediate format data 104 attached with the apparatus processing information 108.

The pieces of apparatus processing information 107 and 108 are referred to when the pieces of intermediate format data 102 and 104 are rasterized (i.e., a process of interpreting intermediate format data and converting the intermediate format data into a raster image). For example, if 90-degree rotation is specified in the apparatus processing information 107 attached to the intermediate format data 102, the rasterization processing unit 16 rotates the drawing coordinate system by 90 degrees and rasterizes the intermediate format data 102, thereby realizing 90-degree rotation. In addition, for example, if 2-up (a process of arranging two logical pages on one physical page) is specified, the rasterization processing unit 16 reduces the size of an image portion represented by the intermediate format data 102 and draws the image portion at a corresponding position on a logical page to which the image portion belongs among the two logical pages of the physical page during conversion of the intermediate format data 102 into a raster image. Additionally, if setting information regarding calibration (color correction) is included in the apparatus processing information 107, the rasterization processing unit 16 performs color correction on pixel values of a raster image determined from the intermediate format data 102 in accordance with the setting information. Furthermore, when marking (of trim marks or the like) are specified in the apparatus processing information 107, the rasterization processing unit 16 translates or reduces the size of a rasterization result in accordance with specified mark positions during rasterization of the intermediate format data 102.

The form/image storage unit 14 is a cache memory that stores data of forms/images. The form/image storage unit 14 receives the form/image intermediate format data 104 attached with the apparatus processing information 108 from the intermediate format data processing unit 12, and stores the form/image intermediate format data 104 in association with the identifier of the corresponding form/image written in the print data 100. The form/image storage unit 14 also registers each form/image to a form/image list 142.

Figure 5:
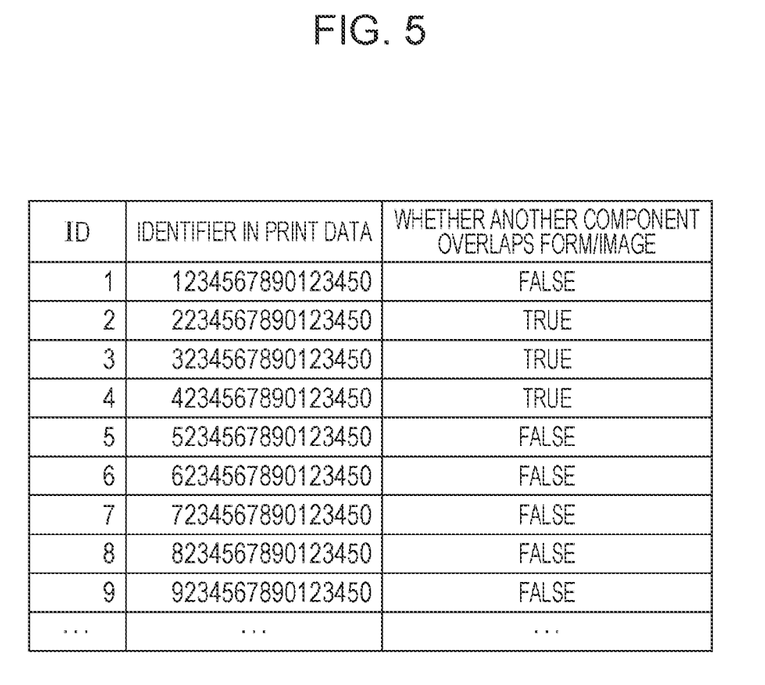
FIG. 5 illustrates an example of data content of a form/image list.

The form/image list 142 is a list for managing forms/images cached in the form/image storage unit 14. FIG. 5 illustrates an example of data content of the form/image list 142. In this example, for each cached form/image object (component), the ID of the object (assigned by the print data interpretation processing unit 10), the identifier of the (form/image) object in the print data 100, and the value of the attribute information 106 of the object (whether or not another component overlaps the form/image) are registered. Additionally, the form/image list 142 may store addresses of the cached form/image intermediate format data 104 and cached raster data 110 (to be described later).

The form/image storage unit 14 also rasterizes each form/image intermediate format data 104 received from the intermediate format data processing unit 12 to generate the raster data 110 of the form/image, and stores the generated raster data 110 in association with the identifier of the form/image written in the print data 100. Through this association with the identifier, the intermediate format data 104 and the raster data 110 are linked to each other regarding a single cached object.

This process of rasterizing the form/image intermediate format data 104 may be executed by the rasterization processing unit 16. Alternatively, the rasterization processing unit 16 is exclusively used for the non-form/image intermediate format data 102, and another rasterization process may be executed for the form/image intermediate format data 104.

During the rasterization, processing such as rotation, coordinate conversion, and color correction is performed in accordance with the setting information regarding rotation, imposition, and so forth included in the apparatus processing information 108 attached to the intermediate format data 104. Through this processing, the generated raster data 110 undergoes the same processing such as rotation, coordinate conversion, and color correction as the processing performed on a raster image generated from the non-form/image intermediate format data 102. Accordingly, when rasterizing the non-form/image intermediate format data 102 in accordance with the apparatus processing information 107, the rasterization processing unit 16 just has to combine a result of the rasterization and the cached raster data 110 as it is (without performing processing such as rotation and coordinate conversion). This leads to speed-up of the combination process.

The form/image intermediate format data 104 may be rasterized and stored once the form/image storage unit 14 receives the intermediate format data 104, for example.

Figure 3:
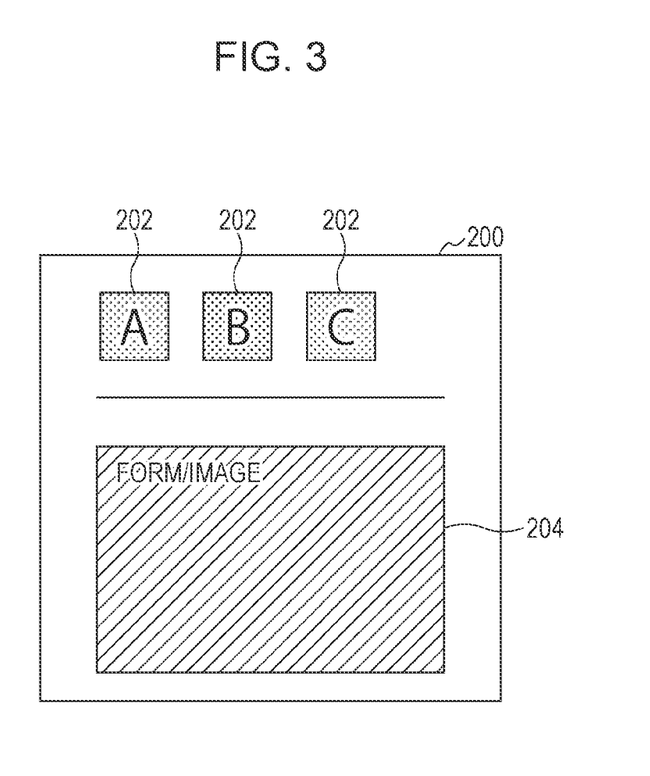
FIG. 3 illustrates a case in which another object does not overlap a form/image.
Figure 4:
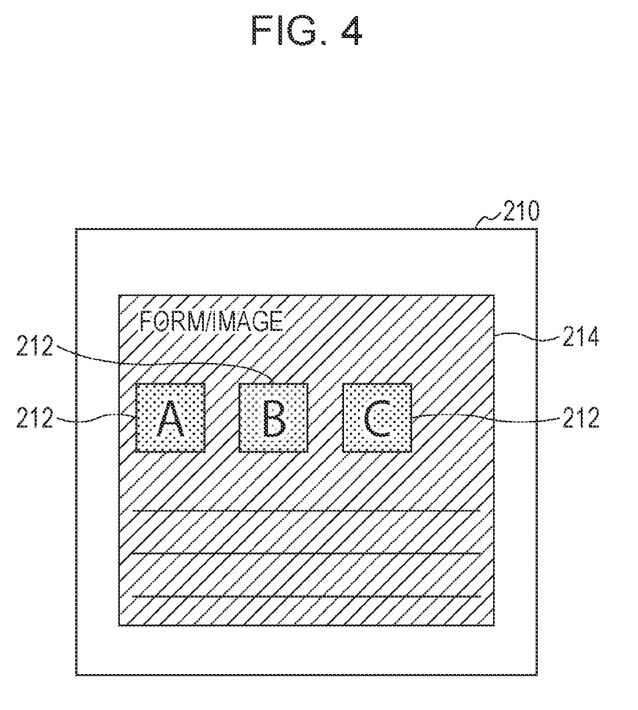
FIG. 4 illustrates a case in which another object overlaps a form/image.

The rasterization processing unit 16 receives the non-form/image intermediate format data 102 attached with the apparatus processing information 107 from the intermediate format data processing unit 12, and sequentially rasterizes the non-form/image intermediate format data 102 from the start, thereby generating a raster image. Upon finding the unique ID (ID assigned by the print data interpretation processing unit 10) of a form/image in the intermediate format data 102 during the rasterization process, the rasterization processing unit 16 refers to the form/image list 142 in the form/image storage unit 14 and determines whether or not another object overlaps the form/image. When determining that another object "does not overlap" the form/image as illustrated in FIG. 3, the rasterization processing unit 16 acquires the raster data 110 cached in association with the "identifier in the print data 100" corresponding to the ID, and combines the acquired raster data 110 with the generated raster image. On the other hand, when determining that another object "overlaps" the form/image as in illustrated in FIG. 4, the rasterization processing unit 16 acquires the intermediate format data 104 cached in association with the "identifier in the print data 100" corresponding to the ID, and rasterizes the acquired intermediate format data 104 in accordance with the apparatus processing information 108, thereby generating raster image data of the form/image. The rasterization processing unit 16 then combines the generated raster image data with the raster image having been generated. As a result of such a process, output image data 120 is generated which is a rasterization result of the print data 100. The generated output image data 120 is supplied to the print engine and is printed on a sheet.

The intermediate format data 104 and the raster data 110 are selectively used depending on whether or not another object overlaps a form/image in this manner because of the following reason.

When another object overlaps a form/image, the process for combining the raster data 110 with a raster image having been generated takes longer than the process for rasterizing the intermediate format data 104.

For example, in order to accurately realize such an overlapping relationship in a combined result, processing is needed in which, for example, a portion of the raster data 110 that lays under another object is knocked out before being combined or in which correction according to the overlapping relationship is performed again on a raster image having already undergone color correction such as adjustment of the total amount of ink.

More specifically, in a case where overprinting is specified as the overlapping relationship, whether or not overprinting is specified is first determined. If overprinting is specified and the background is not to be knocked out, color correction such as adjustment of the total amount of ink in an overlapping portion has to be performed again on a raster image.

Since processing such as correction or change is performed on a raster image, the processing load increases depending on the resolution and gradation characteristics of the raster image. As a result, the processing takes much longer than a case of performing the processing such as correction and change on intermediate format data.

The time taken for rasterizing the original intermediate format data 104 is shorter than the time taken for such processing.

In addition, when another object overlaps a form/image, it may be difficult to correctly realize an overlapping state, such as existence or absence of overprinting, with the method in which the raster data 110 is combined.

With the method of rasterizing the intermediate format data 104, the specified overlapping state is realized by simply rasterizing the form/image intermediate format data 104 after rasterizing the non-form/image intermediate format data 102.

In the description above, the form/image storage unit 14 always generates the raster data 110 from the form/image intermediate format data 104 and stores the generated raster data 110 therein. Instead of this configuration, when an available storage capacity of the form/image storage unit 14 decreases (e.g., falls below a predetermined threshold), the form/image storage unit 14 may stop rasterizing the intermediate format data 104 to be input thereafter (and thus may stop newly storing the raster data 110). In this case, even if the attribute information 106 of the form/image intermediate format data 104 has the value "not overlapping", the raster data 110 of the form/image does not exist in the form/image storage unit 14. Thus, the rasterization processing unit 16 generates the form/image from the intermediate format data 104.

A modification of the above-described exemplary embodiment will now be described with reference to FIG. 6. The modification illustrated in FIG. 6 differs from the example illustrated in FIG. 1 in that the print data processing system includes plural print data interpretation processing units 10 ("three" in the example illustrated in FIG. 6 but the number thereof is not limited to this value). One intermediate format data processing unit 12 and one rasterization processing unit 16 are included as in the example illustrated in FIG. 1.

In this modification, the print data 100 is processed in parallel by the plural print data interpretation processing units 10, whereby conversion of the PDL format print data 100 into intermediate format data is speeded up. The parallel processing may be performed by sequentially assigning pieces of print data of different pages to the print data interpretation processing units 10, for example.

In this case, the intermediate format data processing unit 12 manages the page number of a currently processed page, for example, by using a counter, in order to process the pieces of intermediate format data 102 and 104 sent from the print data interpretation processing units 10, in order of page number. The initial value of the counter is one. After generating the non-form/image intermediate format data 102 and the form/image intermediate format data 104 of the assigned page, each of the print data interpretation processing units 10 notifies the intermediate format data processing unit 12 of the page number of the assigned page, and makes an inquiry about whether or not the pieces of intermediate format data 102 and 104 of the page are receivable. If the page number included in the inquiry is equal to the value of the counter, the intermediate format data processing unit 12 requests the inquiry-source print data interpretation processing unit 10 to supply the pieces of intermediate format data 102 and 104 of the page. In response to this request, the pieces of intermediate format data 102 and 104 are supplied from the print data interpretation processing unit 10 to the intermediate format data processing unit 12. After receiving the pieces of intermediate format data 102 and 104 in this manner and attaching the pieces of apparatus processing information 107 and 108 thereto, the intermediate format data processing unit 12 increments the value of the counter by one (i.e., to get ready to receive the next page).

On the other hand, if the page number included in the inquiry from the print data interpretation processing unit 10 differs from the value of the counter (i.e., if the page number is larger than the value of the counter), the intermediate format data processing unit 12 sends a wait instruction signal (WAIT) to the print data interpretation processing unit 10 to keep the print data interpretation processing unit 10 waiting for transferring the pieces of intermediate format data 102 and 104. The print data interpretation processing unit 10 having received the wait instruction signal waits for a predetermined period, for example, and then sends an inquiry including the page number again to the intermediate format data processing unit 12. If the value of the counter of the intermediate format data processing unit 12 reaches the page number included in the inquiry after repetition of waiting and inquiry, the pieces of intermediate format data 102 and 104 are transferred from the print data interpretation processing unit 10 to the intermediate format data processing unit 12.

If the intermediate format data processing unit 12 is not ready to receive the pieces of intermediate format data 102 and 104 when the inquiry arrives from the print data interpretation processing unit 10 because the intermediate format data processing unit 12 is performing processing or the rasterization processing unit 16 located at the subsequent stage is performing processing, the intermediate format data processing unit 12 may return a wait instruction signal to the print data interpretation processing unit 10.

The processes by the form/image storage unit 14 and the rasterization processing unit 16 may be the same as those described in the example illustrated in FIG. 1.

Figure 6:
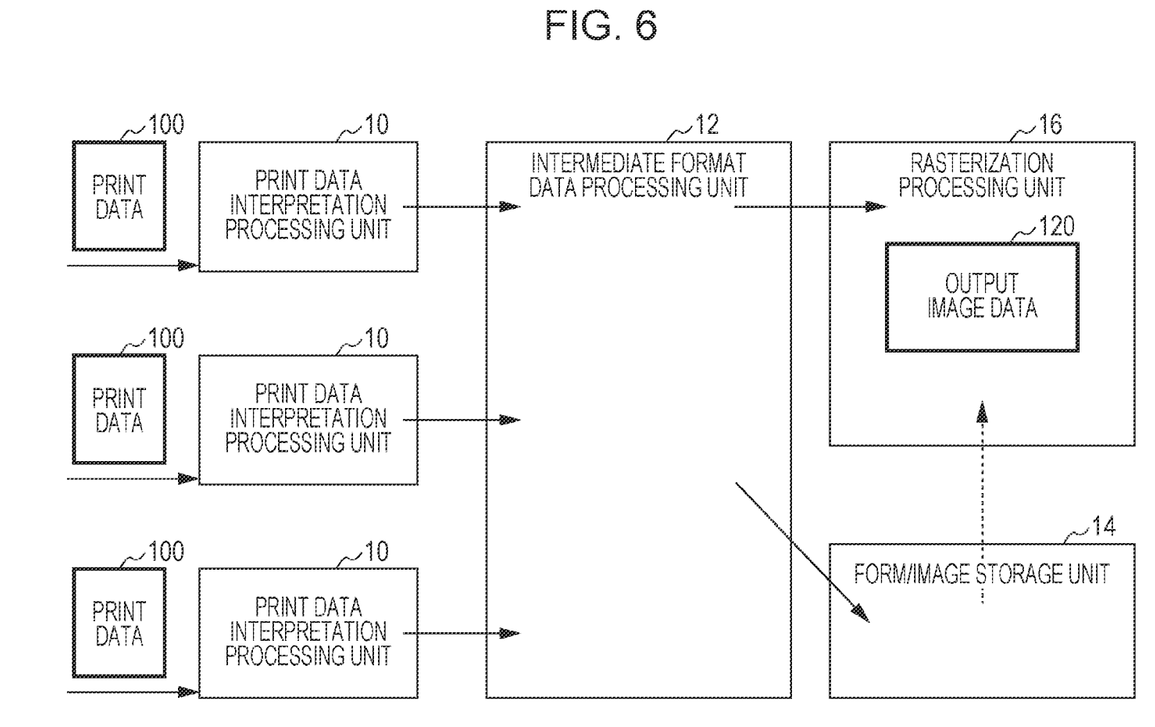
FIG. 6 illustrates an example of a system configuration including plural print data interpretation processing units.

Since only one intermediate format data processing unit 12 is provided for the plural print data interpretation processing units 10 in the example illustrated in FIG. 6, the order of pages is arranged in the intermediate format data processing unit 12 even if the order the plural print data interpretation processing units 10 finish generating the pieces of intermediate format data differs from the order of page number.

Still another modification will now be described with reference to FIG. 7. The modification illustrated in FIG. 7 differs from the modification illustrated in FIG. 6 in that the print data processing system includes not only plural print data interpretation processing units 10 but also plural rasterization processing units 16 ("three" in the example illustrated in FIG. 7 but the number thereof is not limited to this value). One intermediate format data processing unit 12 is included as in the examples illustrated in FIGS. 1 and 6.

In this modification, conversion of the print data 100 into intermediate format data is speeded up by parallel processing performed by the plural print data interpretation processing units 10. Additionally, conversion of the intermediate format data into raster images is speeded up by parallel processing performed by the plural rasterization processing units 16.

Figure 7:
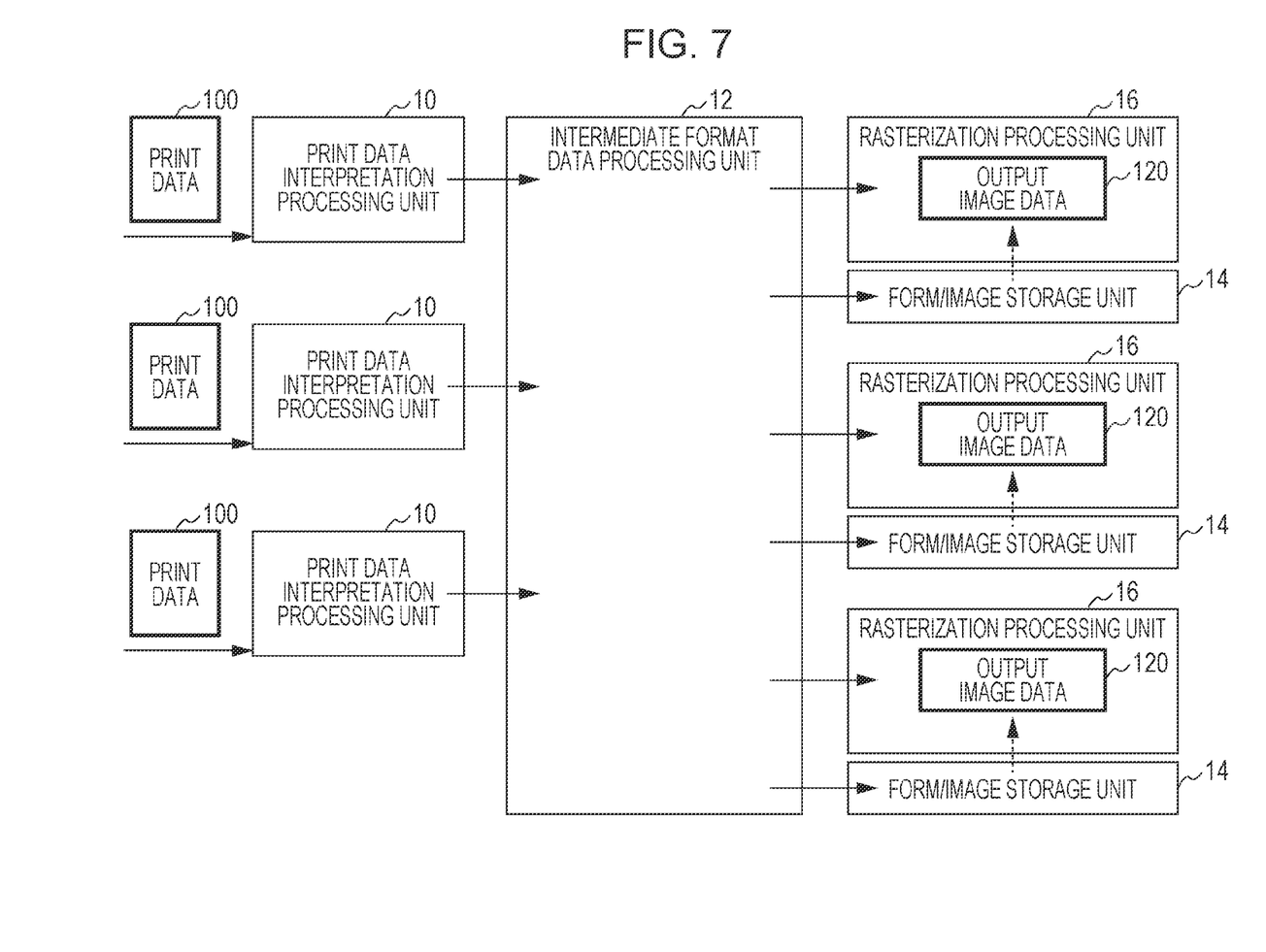
FIG. 7 illustrates an example of a system configuration including plural print data interpretation processing units and plural rasterization processing units.

In the example illustrated in FIG. 7, a dedicated form/image storage unit 14 is provided for each rasterization processing unit 16. The intermediate format data processing unit 12 sequentially assigns pieces of intermediate format data 102 of different pages to the rasterization processing units 16. In this case, the intermediate format data 104 of forms/images included in the pages assigned to each rasterization processing unit 16 may be transferred to the form/image storage unit 14 that corresponds to the rasterization processing unit 16. Alternatively, regardless of the pages assigned to the corresponding rasterization processing unit 16, the pieces of intermediate format data 104 of all forms/images may be transferred to the form/image storage units 14.

Additionally, one form/image storage unit 14 may be shared by the plural rasterization processing units 16.

The same mechanism as the page order arranging mechanism of the intermediate format data processing unit 12 illustrated in the example of FIG. 6 may be provided at the subsequent stage of the plural rasterization processing units 16 in consideration of a case where the order the rasterization processing units 16 finish generating the pieces of output image data 120 differs from the order of page number.

The configuration other than that described above may be the same as that described in the examples of FIGS. 1 and 6.

Some examples have been described above regarding the print data processing system according to this exemplary embodiment. This print data processing system may be included in a printer that includes a print engine, or may be configured as an external apparatus, such as a print server or a printer controller, of a printer.

When the print data processing system is realized as an apparatus in a single casing, the print data processing system may be realized by causing a general-purpose computer included in a printer or an external apparatus of the printer to execute a program that represents processes of the above-described functional modules, for example. Here, the computer has, as hardware, a circuit configuration in which a microprocessor such as a central processing unit (CPU), memory devices (primary storage) such as a random access memory (RAM) and a read only memory (ROM), a hard disk drive (HDD) controller that controls an HDD, various input/output (I/O) interfaces, and a network interface that controls connection to a network such as a local area network (LAN) are connected via a bus, for example. To the bus, a disc drive that performs read and write operations on a portable disc recording medium, such as a compact disc (CD) or a digital versatile disc (DVD), a memory reader/writer that performs read and write operations on a portable nonvolatile recording medium based on each standard, such as a flash memory, and so forth may be connected via the I/O interfaces, for example. The program in which processing content of each functional module described above is written is stored in a fixed storage device, such as an HDD, and is installed into the computer via a recording medium such as a CD or DVD, or via a communication medium such as a network. The program stored in the fixed storage device is read into the RAM and is executed by the microprocessor such as a CPU, whereby the above-described functional modules are realized. Some or all of the functional modules may be configured as a hardware circuit, such as a dedicated large scale integration (LSI), an application specific integrated circuit (ASIC), or a field programmable gate array (FPGA).

Alternatively, the above-described print data processing system may be realized as a combination of plural independent hardware devices. For example, programs for the print data interpretation processing unit 10, the intermediate format data processing unit 12, the form/image storage unit 14, and the rasterization processing unit 16 may be installed into different computers, and the plural computers communicate with each other, whereby the above-described processes may be realized. Additionally, the components illustrated in FIG. 1, 6, or 7 may be grouped in accordance with a relationship in which data is exchanged between the components, and the groups may be implemented in different hardware devices. For example, the print data interpretation processing unit 10 and the intermediate format data processing unit 12 may be implemented in one hardware device, whereas the form/image storage unit 14 and the rasterization processing unit 16 may be implemented in another hardware device.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print data processing system comprising:
 a print data interpretation processing unit that interprets print data of a to-be-printed image written in a page description language, and generates first intermediate format data, second intermediate format data, and attribute information, the first intermediate format data representing each image object of a predetermined type contained in the to-be-printed image, the second intermediate format data representing a portion of the to-be-printed image that is other than each image object of the predetermined type, and the attribute information being information about each image object of the predetermined type and indicating whether or not the image object and another image object overlap within the to-be-printed image;
 a memory that stores the first intermediate format data and first raster image data of each image object of the predetermined type, the first raster image data being generated by performing a drawing process on the first intermediate format data; and a raster image data generation unit that generates second raster image data to be supplied to a printer, by using the first intermediate format data and the first raster image data of each image object of the predetermined type that are stored in the memory and the second intermediate format data, wherein when the attribute information of each image object of the predetermined type indicates that the image object and another image object overlap within the to-be-printed image, the raster image data generation unit reads out the first intermediate format data of the image object from the memory and uses the first intermediate format data in the generation of the second raster image data, and when the attribute information of each image object of the predetermined type indicates that the image object and another image object do not overlap, the raster image data generation unit reads out the first raster image data of the image object from the memory and uses the first raster image data in the generation of the second raster image data.

2. The print data processing system according to claim 1, further comprising an intermediate format data processing unit that receives an input of a print condition regarding the print data from an operator, attaches apparatus processing information representing the received print condition to the first intermediate format data and the second intermediate format data having been generated by the print data interpretation processing unit, and supplies the first intermediate format data attached with the apparatus processing information to the memory and the second intermediate format data attached with the apparatus processing information to the raster image data generation unit, wherein the memory stores the first intermediate format data attached with the apparatus processing information and obtained from the intermediate format data processing unit and first raster image data of each image object of the predetermined type, the first raster image data being generated by performing a drawing process on the first intermediate format data in accordance with the print condition represented by the apparatus processing information, and wherein the raster image data generation unit performs a drawing process on the second intermediate format data attached with the apparatus processing information and obtained from the intermediate format data processing unit, in accordance with the print condition represented by the apparatus processing information, and for each image object of the predetermined type having the attribute information indicating that the first raster image data is to be used, the raster image data generation unit uses the first raster image data stored in the memory and having been generated by performing a drawing process in accordance with the print condition represented by the apparatus processing information.

3. A print data processing method comprising:

interpreting print data of a to-be-printed image written in a page description language and generating first intermediate format data, second intermediate format data, and attribute information, the first intermediate format data representing each image object of a predetermined type contained in the to-be-printed image, the second intermediate format data representing a portion of the to-be-printed image that is other than each image object of the predetermined type, and the attribute information being information about each image object of the predetermined type and indicating whether or not the image object and another image object overlap within the to-be-printed image;

storing in a memory the first intermediate format data and first raster image data of each image object of the predetermined type, the first raster image data being generated by performing a drawing process on the first intermediate format data; and generating second raster image data to be supplied to a printer, by using the first intermediate format data and the first raster image data of each image object of the predetermined type that are stored in the memory and the second intermediate format data, wherein when the attribute information of each image object of the predetermined type indicates that the image object and another image object overlap within the to-be-printed image, the stored first intermediate format data of the image object is read out from the memory and is used in the generation of the second raster image data, and when the attribute information of each image object of the predetermined type indicates that the image object and another image object do not overlap, the stored first raster image data of the image object is read out from the memory and is used in the generation of the second raster image data.

4. A non-transitory computer readable medium storing a program causing a computer to execute a process, the process comprising:

interpreting print data of a to-be-printed image written in a page description language and generating first intermediate format data, second intermediate format data, and attribute information, the first intermediate format data representing each image object of a predetermined type contained in the to-be-printed image, the second intermediate format data representing a portion of the to-be-printed image that is other than each image object of the predetermined type, and the attribute information being information about each image object of the predetermined type and indicating whether or not the image object and another image object overlap within the to-be-printed image;

storing in a memory the first intermediate format data and first raster image data of each image object of the predetermined type, the first raster image data being generated by performing a drawing process on the first intermediate format data; and generating second raster image data to be supplied to a printer, by using the first intermediate format data and the first raster image data of each image object of the predetermined type that are stored in the memory and the second intermediate format data, wherein when the attribute information of each image object of the predetermined type indicates that the image object and another image object overlap within the to-be-printed image, the stored first intermediate format data of the image object is read out from the memory and is used in the generation of the second raster image data, and when the attribute information of each image object of the predetermined type indicates that the image object and another image object do not overlap, the stored first raster image data of the image object is read out from the memory and is used in the generation of the second raster image data.

\* \* \* \* \*